United States Patent [19]
DeVito et al.

[11] Patent Number: 4,782,591
[45] Date of Patent: Nov. 8, 1988

[54] SAW BLADE COOLING SYSTEM

[76] Inventors: Anthony DeVito, 33 Croft La., Smithtown, N.Y. 11787; Jesse P. Competiello, 239 N. Suffork Ave., Massapequa, N.Y. 11758

[21] Appl. No.: 124,029

[22] Filed: Nov. 23, 1987

[51] Int. Cl.⁴ .............................................. B23D 45/16
[52] U.S. Cl. .................................... 30/123.3; 30/388; 51/267
[58] Field of Search .................................. 30/388–391, 30/123.3; 83/168, 169, 171; 51/267; 125/13 R; 299/39

[56] References Cited

U.S. PATENT DOCUMENTS

| | | | |
|---|---|---|---|
| 495,830 | 4/1893 | Pake | 83/171 |
| 2,294,497 | 9/1942 | Zawistowski | 30/123.3 |
| 2,746,495 | 5/1956 | Greenlaw | . |
| 2,815,562 | 12/1957 | Wilkie et al. | 83/171 X |
| 2,991,599 | 7/1961 | Else | 51/267 |
| 3,753,637 | 8/1973 | Gasior et al. | 425/313 |
| 3,848,929 | 11/1974 | Miller | 299/39 |
| 3,896,783 | 7/1975 | Manning | 51/267 X |
| 4,083,278 | 4/1978 | Steffan | 83/169 |
| 4,414,783 | 11/1983 | Vincent | 51/267 |
| 4,484,417 | 11/1984 | Klingerman | 30/123.3 |

Primary Examiner—Douglas D. Watts
Attorney, Agent, or Firm—Leonard Belkin

[57] ABSTRACT

Apparatus and method for the cooling of a rotating cutting blade in a portable circular saw used to cut concrete. A pair of pipes are mounted on opposite sides of the blade extending from a manifold mounted on the base plate. The pipes are provided with spaced openings facing the blade and water under pressure is pumped into the pipes through a hose connection to the manifold so that there is a continuous spray of water against the surfaces of the blade preventing overheating of the blade.

3 Claims, 1 Drawing Sheet

SAW BLADE COOLING SYSTEM

BACKGROUND OF THE INVENTION

This invention relates to a system and method for cooling a cutting blade in a portable circular saw used in cutting concrete, tile blocks and similar material where large amounts of heat are generated.

At the present time, when a power saw is employed to cut concrete, it is necessary to pause, sometimes at frequent intervals, when the blade begins to overheat. This results in an increase in the cost of cutting the material.

The use of liquid coolants for cutting blades is not new. U.S. Pat. Nos. 495,830, 2,746,495, 2,815,562, 3,753,637, 3,848,929, 4,083,278, and 4,414,783 show a variety of arrangements in which liquids are employed as coolants.

The arrangements described in the above patents are either excessively complicated or would provide inadequate cooling in situations where there is high rate of heat generation, for example, where concrete is being cut by a blade. In addition, the patented arrangements are not suitable for use with portable circular power saws.

SUMMARY OF THE INVENTION

In the present invention a cooling system and method for portable circular saws is provided which is simple in construction, readily dismountable for convenient storage when not in use, economic in its application, and highly effective in preventing overheating of the cutting blade.

A preferred embodiment of this invention comprises a portable circular saw with a base plate and means for cooling the cutting blade while in operation consisting of a pair of extended pipes on opposite sides of the blade supplied by cooling water from a manifold mounted on the base plate. The extended pipes have spray openings to direct water against the cutting blade. A hose connection is provided to supply the water. The assembly is readily taken apart for storage.

In another preferred embodiment of this invention there is provided a method of cooling a rotating cutting blade while in use comprising the steps of mounting a pair of pipes on opposite sides of said blade, said pipes being provided with a plurality of spaced openings on the circumferences of said pipes facing the surfaces of said blade, and supplying water under pressure into said pipes while said blade is rotating so that a steady spray of water is directed at both sides of said blade while in operation.

It is therefore a principal object of this invention to provide an efficient, effective and economic cooling system for the rotating cutting blade of a portable circular saw generating substantial amounts of heat.

Other objects and advantages of this invention will hereinafter become obvious from the following detailed description of preferred embodiments of this invention.

DETAILED DESCRIPTION OF THE PREFERRED EMBODIMENTS

Figure 1:
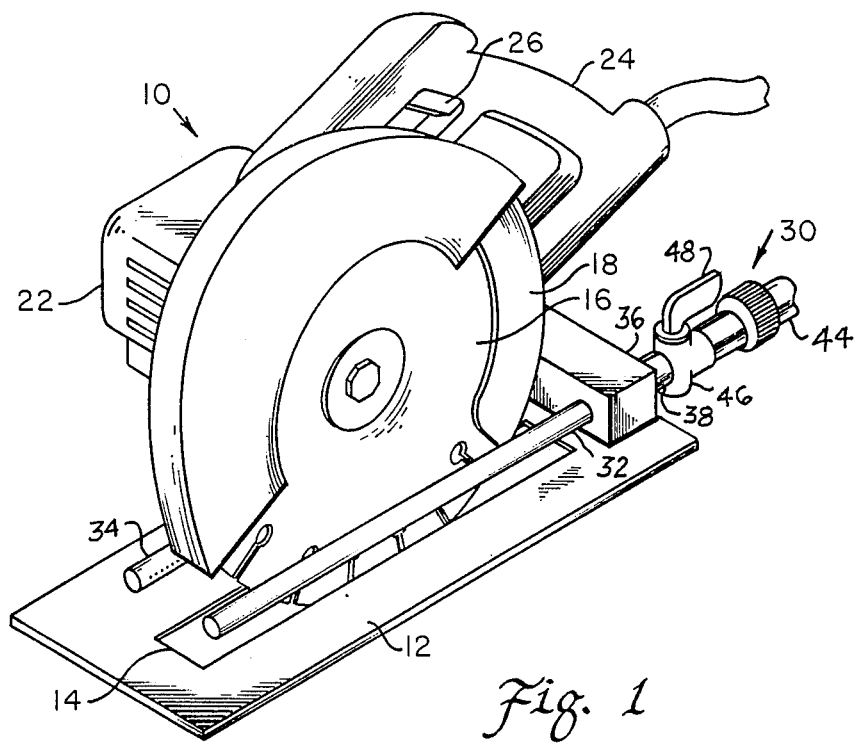
FIG. 1 is an isometric view of a circular saw incorporating a preferred embodiment of this invention.

Referring to FIG. 1, circular saw 10, as known in the art, consists of a base plate 12 having a slot 14 to accommodate circular cutting blade 16 carried within a shield 18 and driven by a motor (not shown) located within housing 22. A handle 24 carrying a trigger 26 renders saw 10 portable.

When circular saw 10 is employed with a proper blade for the cutting of concrete or tile blocks, ordinarily cutting must be halted at frequent intervals to permit the blade to cool with consequent loss of time and efficiency.

Figure 2:
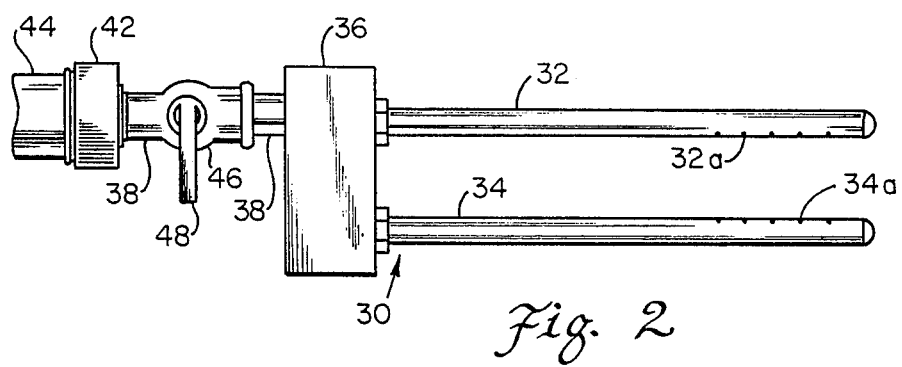
FIG. 2 is a plan view of spraying apparatus incorporating a preferred embodiment of this invention.
Figure 3:
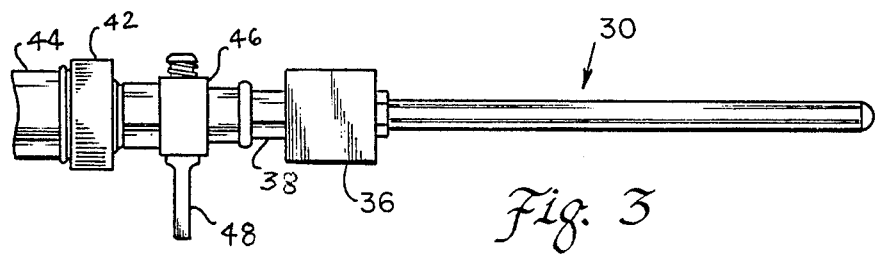
FIG. 3 is an elevation view of the apparatus shown in FIG. 1 looking down on FIG. 2.

To provide cooling of circular saw 10, there is mounted on base plate 12 a blade cooling assembly 30 which is shown in greater detail in FIGS. 2 and 3.

Assembly 30 consists of a pair of spaced, parallel spray tubes 32 and 34 closed at their free ends and extending from a manifold 36. Each of tubes 32 and 34 is threaded to permit their being threaded into manifold 36 so that, if required, the tubes may be conveniently replaced with new tubes if needed, of different length, or a different arrangement of the spray openings 32a and 34a which are illustrated, or to permit convenient storage of assembly 30 when its use is not required.

Extending from the other side of manifold 36 is a threaded tube 38 on the other end of which is a hose connection 42 to permit water hose 44 to be connected thereto. A shut off valve 46 is controlled by a handle 48. Tube 38 is removable so that assembly 30 can be readily disassembled with the removal of tubes 32 and 34 and also to permit any other type of a tube to be connected to manifold 36 if desired.

Assembly 30 may be mounted on base plate 12 by threaded openings (not shown) under manifold 36 so that screws (not shown) passing through openings in plate 12 can be threaded into those openings, thereby rendering manifold 36 readily removable.

When assembly 30 is mounted on base plate 12 as shown in FIG. 1, water cooling of cutting blade 16 is accomplished merely by opening valve 46. When cooling is not required, assembly 30 may be conveniently taken apart by unscrewing readily removable tubes 32, 34, and 38.

There has thus been provided a practical and inexpensive system and method for providing cooling of a cutting blade in a portable circular saw.

While only certain preferred embodiments of this invention have been described, it is understood that many variation of this invention are possible without departing from the principles of this invention as defined by the claims which follow.

What is claimed is:

1. In combination, a circular saw having a base plate, a rotatable cutting blade for sawing, and readily dismountable means for cooling said blade while in operation consisting of a readily removable manifold mounted on said base plate, a pair of readily removable pipes extending from said manifold along opposite sides of said blade, a plurality of spaced openings along each of said pipes located on the circumference of said pipes facing said cutting blade, and a hose connected into said manifold through a readily removable connecting pipe for supplying water under pressure into said pipes so as to cause a spray of said water on the surfaces of said blade while the latter is in operation.

2. The combination of claim 1 in which said pipes are threadable into said manifold for convenient removal and replacement.

3. The method of cooling a rotating cutting blade in a portable circular saw having a base plate comprising the steps of mounting a readily removable manifold on said base plate from which extend a pair of readily removable pipes on opposite sides of said blade, said pipes being provided with a plurality of spaced openings on the circumferences of said pipes facing the surfaces of said blade, and supplying water under pressure into said manifold through a readily removable hose connection into said manifold while said blade is rotating so that a steady spray of water is directed at both sides of said blade while in operation, said manifold and pipes being readily dismountable for storage.

* * * * *